(12) United States Patent
Sambhus et al.

(10) Patent No.: US 7,257,822 B1
(45) Date of Patent: Aug. 14, 2007

(54) METHOD AND SYSTEM FOR ADDRESS BOOK APPLICATION PROGRAMMING INTERFACE

(75) Inventors: Mihir Sambhus, Milpitas, CA (US); Sathyanarayanan Kavacheri, Sunnyvale, CA (US)

(73) Assignee: Sun Microsystems Inc, Santa Clara, CA (US)

( * ) Notice: Subject to any disclaimer, the term of this patent is extended or adjusted under 35 U.S.C. 154(b) by 479 days.

(21) Appl. No.: 10/823,321

(22) Filed: Apr. 13, 2004

(51) Int. Cl.
*G06F 9/44* (2006.01)
(52) U.S. Cl. .......................... 719/328; 707/10; 709/245
(58) Field of Classification Search ................. 707/10, 707/102, 104.1; 709/209, 245; 719/328
See application file for complete search history.

(56) References Cited

U.S. PATENT DOCUMENTS

| | | | | |
|---|---|---|---|---|
| 5,835,089 A | * | 11/1998 | Skarbo et al. ............. 715/751 |
| 6,147,773 A | * | 11/2000 | Taylor et al. ............... 358/400 |
| 6,349,299 B1 | * | 2/2002 | Spencer et al. .............. 707/10 |
| 6,973,448 B1 | * | 12/2005 | Monberg et al. .............. 707/1 |
| 6,990,672 B2 | * | 1/2006 | Maguire et al. ............ 719/328 |
| 2002/0049610 A1 | * | 4/2002 | Gropper ....................... 705/1 |
| 2003/0233409 A1 | * | 12/2003 | Awada et al. ............... 709/206 |
| 2005/0044152 A1 | * | 2/2005 | Hardy et al. ................ 709/206 |
| 2005/0120084 A1 | * | 6/2005 | Hu et al ..................... 709/206 |

* cited by examiner

*Primary Examiner*—Cheryl Lewis
(74) *Attorney, Agent, or Firm*—Osha Liang LLP

(57) ABSTRACT

An address book API according to the present invention includes an abstracted API and one or more address book specific adapters. The abstracted API provides functionalities common to a plurality of address book programs. The abstracted API is abstract enough to readily interface with various address books. Each adapter provides for address book program specific implementation of functionalities.

12 Claims, 3 Drawing Sheets

METHOD AND SYSTEM FOR ADDRESS BOOK APPLICATION PROGRAMMING INTERFACE

BACKGROUND

Referring to FIG. 1, a block diagram of communication between an application and a plurality of address book programs. Typically, the application (e.g., word processor program, e-mail program and the like) is running on a client device and each address book program is provided by a corresponding server. The application includes a server dependent application programming interface (server dependent API) for each address book. Each server dependent API 125, 135, 145 enables the application 105 to access a corresponding address book program 120, 130, 140.

Currently, there is no common interface to access address book programs on different servers, such as Sun Microsystems' SunOne, Microsoft's Exchange, Lotus' Notes, and/or the like. If a new address book program is to be accessed by the application, the programming code of the application needs to be modified to add a corresponding new server dependent API.

SUMMARY OF INVENTION

Embodiments of the invention provide a method and system for use with an address book application programming interface (address book API). In one embodiment, the address book API comprises an abstracted API and one or more address book specific adapters. The abstracted API provides an interface for communication with a plurality of applications (e.g., word processor program, e-mail program and the like). Each adapter provides for communicating with a specific address book program. The abstracted API is abstract enough to readily interface with various address book programs.

In one embodiment, the address book API establishes an abstraction of a session generic to all address book programs and then implements the abstraction of the session, specific to an address book program requested by an application. The computer implemented method also includes creating an abstraction of opening a default address book program and implementing the abstraction to open the requested address book program. Thereafter, an abstraction of an operation may be generated. The abstraction of the operation is implemented to perform an operation (e.g., fetch, modify, add, delete and/or the like) on the requested address book program.

In another embodiment, the computer implemented method of communication between an application and an address book program includes establishing a session between the application and the address book program, opening the address book program and performing an operation on the address book program. An abstraction of the session is provided by an abstracted API. The implementation of the abstraction may be provided by an address book specific adapter. An abstraction of opening the address book program is provided by the abstracted API. The implementation of the abstraction of opening the address book program is provided by the address book specific adapter. An abstraction of performing the operation is also provided by the abstracted API. The implementation of the abstraction of performing the operation is provided by the address book specific adapter.

Other aspects and advantages of the invention will be apparent from the following description and the appended claims.

DETAILED DESCRIPTION

Reference will now be made in detail to the embodiment of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present invention, numerous specific details are set forth in order to provide a thorough understanding of the present invention. However, it is understood that the present invention may be practiced without these specific details. In other instances, well-known methods, procedures, components, and circuits have not been described in detail as not to unnecessarily obscure aspects of the present invention.

Figure 1:
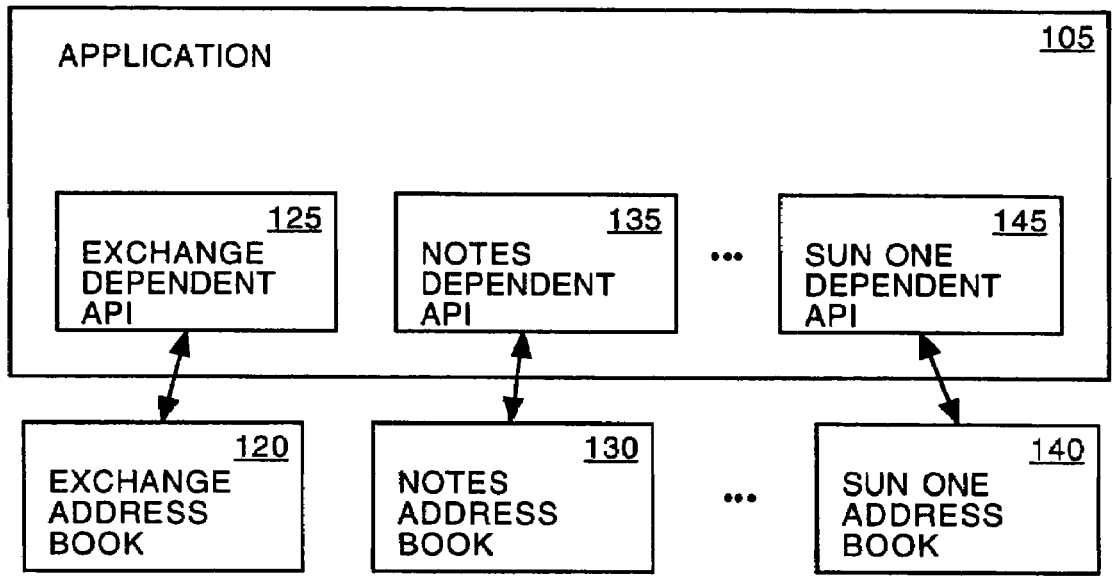
FIG. 1 shows a block diagram of communication between an application and a plurality of address books in accordance with the conventional art.
Figure 2:
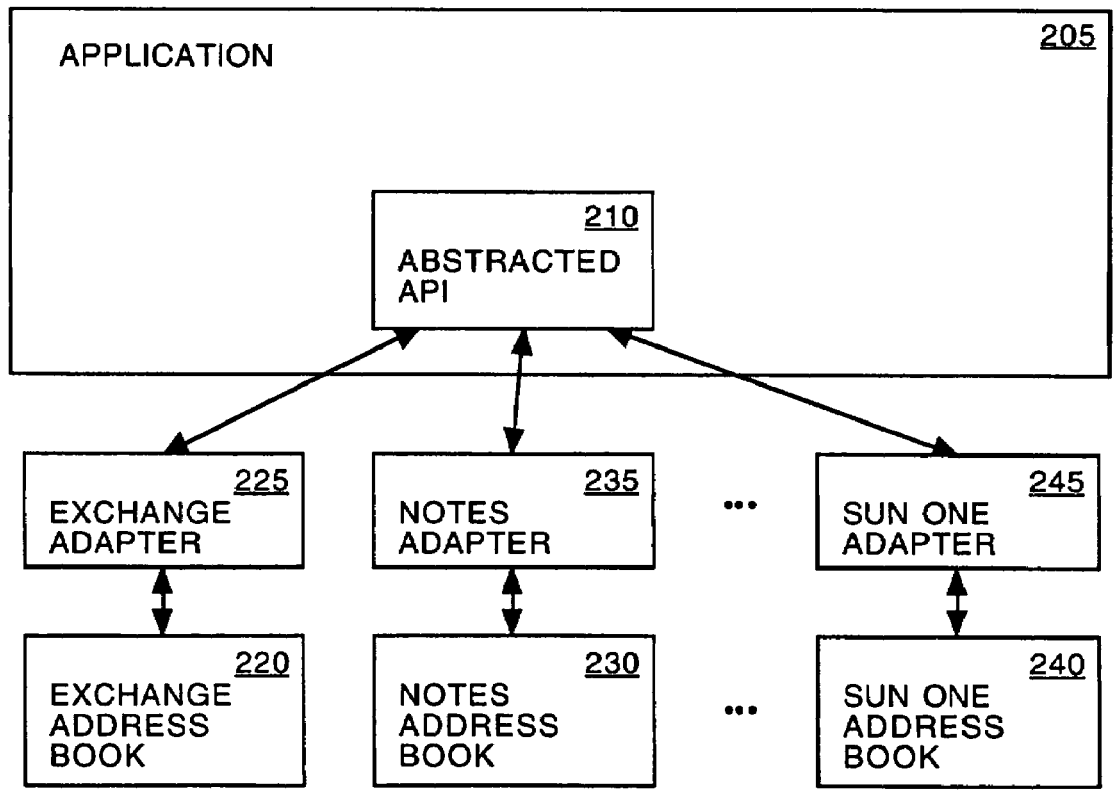
FIG. 2 shows a block diagram of an exemplary address book application programming interface in accordance with an embodiment of the invention.

Referring to FIG. 2, a block diagram of an exemplary address book application programming interface (address book API), in accordance with one embodiment of the invention, is shown. The address book API provides the method by which an application program 205 can access one or more address book programs 220, 230, 240. As depicted in FIG. 2, the address book API includes an abstracted application programming interface (abstracted API) 210 and one or more adapters 225, 235, 245.

The abstracted API 210 contains programming code, common to each address book program, necessary to establish a session with each address book program, open an address book program and perform various operations (e.g., fetch, add, modify, delete and/or the like) thereon. Each adapter 225, 235, 245 contains programming code, specific to a corresponding address book program, necessary to establish a session with the corresponding address book program, open the address book program and perform various operations (e.g., fetch, add, modify, delete and/or the like) thereon. In one implementation, the abstracted API 210 and adapters 225, 235, 245 are written in a platform independent programming language (e.g., Java) and are Lightweight Directory Access Protocol (LDAP) complaint. One skilled in the art can appreciate that the abstracted API and adapters could be compliant to a protocol for a particular type of address book program, e.g., Microsoft Exchange Address Book protocol, Lotus Notes Address Book protocol, SunOne Address Book protocol, etc.

In one embodiment, the abstracted API 210 provides minimal implementation. The abstracted API 210 is predominantly an interface with implementation specific code delegated to the adapters 225, 235, 245. The abstracted API 210 is address book program independent. The adapters 225, 235, 245 are plug-able programming routines. Thus, the abstracted API 210 (and the application 105) does not need to be re-coded to support a new address book program. Instead, an adapter providing address book program dependent functionality for the new address book program is coded and plugged-in.

Figure 3:
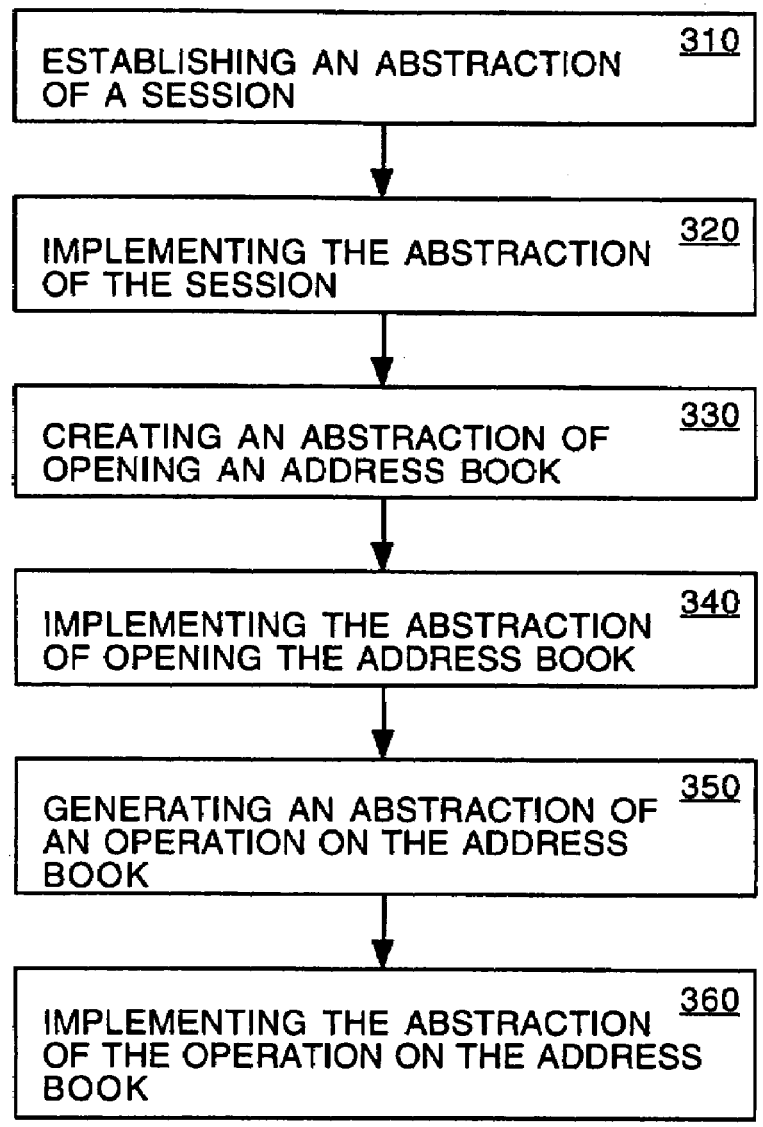
FIG. 3 shows a flow diagram of a computer implemented method of communication between an application and an address book performed by an address book application programming interface in accordance with an embodiment of the invention.

Referring now to FIG. 3, a flow diagram of a computer implemented method of communicating between an application and an address book program performed by an address book application programming interface (address book API), in accordance with one embodiment of the invention, is shown. As depicted in FIG. 3, the method of communication begins with establishing an abstraction of a session, at 310. The abstracted session is generic to a plurality of address book programs. At 320, the abstraction of the session is implemented. The abstraction of the session is implemented specific to a particular address book program requested by the application.

In one embodiment of the invention, the session includes connecting and authenticating by passing one or more configuration properties (e.g., host, port, user, etc.) associated with the particular session to an address book session (ABSession). The ABSession passes the service specific properties and the store object to the address book store (ABStore). The ABStore also passes a store connect to the address book being accessed. The ABStore creates and returns an adapter specific store object based on the services being accessed. In response, the ABSession calls the ABStore to authenticate the user. The ABStore returns to the application notification that the connection has been established and the user has been authenticated or that the attempt to establish a connection has failed.

The ABSession is an entry point into the abstracted API. The ABSession returns an instance of the session object. The session object is a container class that encapsulates the service specific properties and the store object. The required and optional properties (e.g., user name, user password, admin domain, admin password, base domain and/or the like) are defined by the individual adapters. The session object creates and returns an adapter specific store object based on the services being accessed. The ABStore abstract class represents an address book connection per user that encapsulates the authentication related methods (e.g., connect, disconnect, is connected and/or the like).

At 330, an abstraction of opening an address book program is created. The abstraction of opening the address book is generic to the plurality of address book programs. At 340, the abstraction of opening the address book program is implemented. The abstraction of opening the address book program is implemented specific to the particular address book program requested by the application.

In one embodiment of the invention, the ABStore also includes commands to open a default address book program. The ABStore stores a reference to the address book session object which instantiated it, so as to get access to the properties store in the session object.

At 350, an abstraction of an operation on the address book is generated. The abstraction of the operation is generic to the plurality of address book programs. At 360, the abstraction of the operation on the address book program is implemented. The abstraction of the operation is implemented specific to the particular address book program requested by the application. The operation may include a fetch, addition, modification, deletion of the address book contacts, groups, or distribution lists, or the like.

In one implementation, the AddressBook abstracted class represents an address book of a user. The commands of the AddressBook abstracted class may include fetch, add, delete, modify and/or the like, of address book entries, groups, distribution lists and/or the like. The AddressBook abstracted class is identified by an address book identifier stored in the session object. The implementation of the AddressBook abstracted class is provided by the adapters.

The Elements class forms the super class of Entry and Group classes and may contain all the attributes common to both. The Elements class contains a property called elementType, which defines whether the Element object created is an Entry, a Group or the like. The values for elementType are: Element.ENTRY; Element.GROUP; Element.ALL; and Element.UNSPECIFIED. It also contains a properties hashmap for use by the adapters in storing and retrieving any extra name-value pairs specific to the backend service.

The Entry class extends from the Elements class. The Entry class defines the elementType to be Element.ENTRY. This class encapsulates the attributes associated with an Address Book entry (e.g., first name (fn), last name (ln), hp, fp, pp, mp, em and/or the like). The Entry class contains a comprehensive list of attributes for the services. The Entry object is passed on to the methods in the ABStore like add, modify, delete fetch and/or the like.

The Group class extends from the Elements class. The Group class defines the elementType to be Element.GROUP. The Group object is passed on to the methods in the ABStore, such as add, rename, delete, fetch and/or the like.

The ABFilter class specifies the search and sort filters to be applied for the address book fetch command. The search parameters are defined in the ABSearchTerm objects. The methods included are setting the searchTerm object, which contains the attributes to search the address book on, setting the group to search in, setting the sort fields and order of sort, and/or the like.

The ABSearchTerm abstract class specifies a single search term or a combination of search terms. The base search term is of the form of a name value pair (e.g., "1=doe"). It also stores the boolean 'exact' which indicates whether the search should be an exact or a contained search. The search term is converted into an adapter specific search filter by the abstracted method ABSearchTerm.compute. The implementation of the computer method recurses through the search terms and gets a final search filter.

An exemplary communication between an application and an address book program is illustrated in Table 1.

TABLE 1

```
// Define the service of type ldap, based on the properties set in the
// channel and pass the relevant attributes to the factory
String service = "com.sun.portal.ab.ldap.LdapABStore";
Properties props = new Properties( );
props.put("ab.host", "iwps.red.iplanet.com");
props.put("ab.port", "389");
...
...
//Also put the user name and password in the Props object
props.put("ab.username", "b");
ABSession session = null;
ABStore store = null;
AddressBood ab = null;
// Get the Session object
```

TABLE 1-continued

```
try {
    session = ABSession.getInstance(props);
    // Get the adapter specific store object
    store = session.getABStore(service);
    // Try connecting the store object to the backend service
    store.connect( );
    // Get the default Address book object from the store
    ab = store.openAddressBook( );
} catch (Exception e) {
    System.out.println("Could not make a connection to the address book");
}
// Do operations on the Address book e.g., fetch
// Define an entry object with the fields to search on
// Define search terms ..search on something like ((ln~doe | ln=smith) & fn=john & state!=ca)). Here the search criteria is (any=*).
ABSearchTerm term = ab.newABSearchTerm("any", "*", true);
ABFilter filter = new ABFilter( );
filter.setSortBy("ln");
filter.setSortOrder(LdapABConstants.ASCENDING);
filter.setSearchTerm(term);
// Retrieve all types of elements - entries and groups - from the address book
filter.setElementType(Element.ALL);
Elements[ ] elements = null;
Try{
    elements = (Element[ ]) ab.fetch(filter);
} catch (Exception e) {
 e.printStackTrace( );
}
...
...
```

Various exemplary combinations of search terms are illustrated in Tables 2, 3 and 4.

TABLE 2

```
// any = *
ABSearchTerm term = ab.newABSearchTerm("any", "*", true);
ABFilter filter = new ABFilter( );
filter.setSearchTerm(term);
ab.fetch(filter);
```

TABLE 3

```
// (ln = *Doe*) & (! (fn = Joe))
ABSearchTerm[ ] terms = new ABSearchTerm[2];
terms[0] = ab.newABSearchTerm("ln", "Doe", false);
terms[1] = ab.newABSearchTerm(ab.newABSearchTerm("fn", "Joe", true), ABSearchTerm.NOT);
term = ab.newABSearchTerm(terms, ABSearchTerm.AND);
ABFilter filter = new ABFilter( );
filter.setSearchTerm(term);
ab.fetch(filter);
```

TABLE 4

```
// ((ln = *Doe*) & (fn = Joe)) & ((em = *iwps*)|(bp = *408*)|(hp = *408*))
ABSearchTerm[ ] terms1 = new ABSearchTerm[2];
ABSearchTerm[ ] terms2 = new ABSearchTerm[3];
ABSearchTerm[ ] terms3 = new ABSearchTerm[2];
terms1[0] = ab.newABSearchTerm("ln", "Doe", false);
terms1[1] = ab.newABSearchTerm("fn", "Joe", true);
// First compound search term
terms2[0] = ab.newABSearchTerm("em", "iwps", false);
terms2[1] = ab.newABSearchTerm("bp", "408", false);
terms2[2] = ab.newABSearchTerm("hp", "408", false);
// Second compound search term
terms3[0] = ab.newABSearchTerm(terms1, ABSearchTerm.AND);
terms3[1] = ab.newABSearchTerm(terms2, ABSearchTerm.OR);
```

TABLE 4-continued

```
term = ab.newABSearchTerm(terms3, ABSearchTerm.AND);
ABFilter filter = new ABFilter( );
filter.setSearchTerm(term);
ab.fetch(filter);
```

Figure 4:
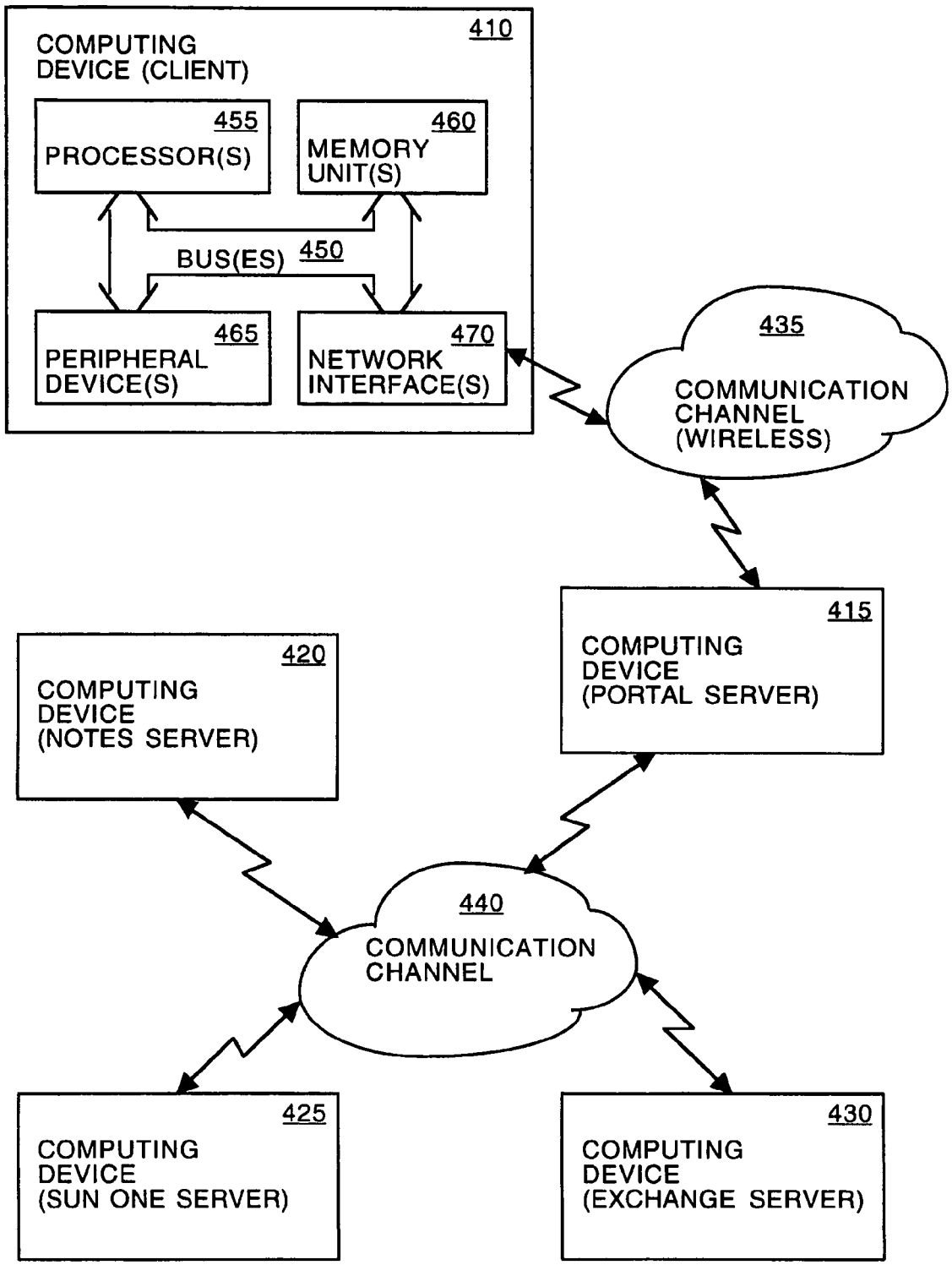
FIG. 4 shows a block diagram of an exemplary computer network for implementing an address book application programming interface in accordance with an embodiment of the invention.

Referring now to FIG. 4, a block diagram of an exemplary computer network for implementing an address book application programming interface (address book API), in accordance with one embodiment of the invention, is shown. As depicted in FIG. 4, the exemplary computer network includes a plurality of computing devices 410-430 communicatively coupled by one or more communication channels 435-440. In one implementation, computing device 410 is a client device. The client device 410 may be an embedded system, personal computer, a personal digital assistant, an intelligent telephone or the like. Computing device 415 may be a portal server. Computing devices 420-430 may be a Microsoft Exchange server, a Sun Microsystems SunOne Address Book server, a Lotus Notes server and/or the like.

Each computing device (e.g., for example the computing device 410) includes one or more buses 450 for communicating information and instructions. One or more processors 455 are coupled to the bus 450 for processing information and instructions. One or more memory units 460 are also coupled to the bus 450 for storing information and instructions for the processor 455. The memory unit 460 may include volatile memory (e.g. random access memory, static RAM, dynamic RAM, and the like), non-volatile memory (e.g. read only memory, programmable ROM, flash memory, EPROM, EEPROM, and the like), mass data storage (e.g. hard disk, optical disk, floppy disk, and the like), and the like. Optionally, the network device may include one or more peripheral devices (e.g. display, keyboard, pointing device, speaker, and the like) 465 coupled to the bus 450. The computing device 410 also includes one or more network interfaces 470 coupled to the bus 450. The network interface 470 provides for communicating with other network devices 415-430 across the one or more communication channels 435-440.

Certain processes and steps of embodiments of the invention are realized as a series of instructions (e.g., code) that reside on one or more computer-readable mediums, such as the memory unit 460, and are executed by the processor 455 of one or more of the computing devices 410-430. When executed, the instructions cause the processor 455 to provide an operating system, one or more applications, an abstracted API, one or more adapters (e.g., Exchange adapter, Notes adapter, SunOne adapter, and/or the like) and one or more address book programs (e.g., Exchange, Notes, SunOne Address Book, and/or the like).

The abstracted API is a program routine within an application running on the client device 410 and/or the portal server 415. The one or more adapters are program routines running on the client device 410 and/or the portal server 415. The abstracted API and a given adapter (e.g., Exchange adapter) provide a complete set of functionality for accessing a given address book server 420-430. The abstracted API provides a set of abstracted functionalities for accessing the address book. Each adapter provides for the implantation of the abstracted functionalities specific to the particular corresponding address book server 420-430. The abstracted API and the adapters may be written in a platform independent programming language (e.g., Java) and may be lightweight directory access protocol (LDAP) compliant.

When an application executing on the client device 410 accesses a particular address book server, the abstracted API and the corresponding adapters provide for calling the requested address book server 420-430 (e.g., SunOne server). The abstracted API provides a connection pooling mechanism to efficiently use network resources. The abstracted API and the corresponding adapter (e.g., SunOne adapter) establish a session by creating a connection and providing for authentication.

When the application retrieves an address book, a proxy authentication is followed. The user's credentials may be utilized to check the user's authenticity. The user name, password and the user's domain name are utilized at the adapter level for authentication with the respective address book server.

Once the user's credentials are validated, the application is able to access the requested address book stored on the particular address book server 420-430. More specifically, the abstracted API and the corresponding adapter return a default address book from the corresponding address book server 420-430. Thereafter, the corresponding adapter provides the address book server specific functionalities necessary perform various operations (e.g., fetch, add, modify, delete and/or the like) on the address book.

The abstracted API provides minimal implementation. The abstracted API provides a set of abstracted functionalities that are common to all of the address book servers. Each adapter provides the address book server specific implementation of the abstracted functionalities.

Accordingly, embodiments of the invention advantageously separate server dependent programming code for implementing functionality of the adapters from the generic functionality of the abstracted API. Embodiments of the invention also advantageously reduce or eliminate the need to add or change code in a given application in response to changes required by revision of an existing address book server or addition of a new address book server.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A system comprising:
    a computer system comprising:
    a storage device comprising an application programming interface and an adapter; and
    a processor configured to execute the application programming interface and the adapter;
    wherein said application programming interface is configured, when executed, to enable communication between an application and said adapter, wherein said application programming interface is configured to provide a common interface for accessing a plurality of address book programs, wherein a first address book program of said plurality of address book programs comprises a first server-dependent application programming interface and a second address book program of said plurality of address book programs comprises a second server-dependent application programming interface; and
    wherein said adapter is configured, when executed, to enable communication between said application programming interface and one of said plurality of address book programs,
    wherein said adapter performs at least one address book operation on an address book entry in said first address book program, and wherein said at least one address book operation comprises one selected from a group consisting of fetching said address book entry, modifying said address book entry, adding said address book entry, and deleting said address book entry.

2. The system according to claim 1, wherein said application programming interface comprises a first set of programming code generic to said plurality of address book programs.

3. The system according to claim 2, wherein said adapter comprises a second set of programming code specific to said one of said plurality of address book programs.

4. The system according to claim 1, wherein said application programming interface and said adapter are written in a platform independent programming language.

5. The system according to claim 4, wherein said platform independent programing language is Java.

6. The system according to claim 1, wherein said application programming interface and said adapter are substantially lightweight directory access protocol compliant.

7. A computer-readable storage medium containing instructions which when executed cause a computing device to implement a method of communicating between an application and a plurality of address book programs comprising:
    establishing a session between said application and a first address book program of the plurality of address book programs, wherein an implementation of said session is provided by an adapter for communicating between said application and said first address book program;
    accessing said first address book program using said adapter; and
    performing an operation on an address book entry in said first address book program using said adapter, wherein said operation is one selected from a group consisting of fetching said address book entry, modifying said address book entry, adding said address book entry, and deleting said address book entry,
    wherein an address book application programming interface provides a common interface for access to said plurality of address book programs, wherein said first address book program comprises a first server-dependent application programming interface and a second address book program of said plurality of address book programs comprises a second server-dependent application programming interface.

8. The computer-readable storage medium according to claim 7, wherein said application programming interface comprises programming code common to the plurality of address books programs.

9. The computer-readable storage medium according to claim 8, wherein said adapter comprises programming code dependent from said first address book program.

10. The computer-readable storage medium according to claim 9, wherein said plurality of address book programs are lightweight directory access protocol compliant.

11. The computer-readable storage medium according to claim 7, wherein said application programming interface and said adapter are written in a platform independent programming language.

12. The computer-readable storage medium according to claim 11, wherein said platform independent programming language is Java.

* * * * *